United States Patent
Khoury (10) Patent No.: US 11,770,678 B2
(45) Date of Patent: Sep. 26, 2023

(54) ONE-WAY PHASE-BASED HIGH ACCURACY DISTANCE MEASUREMENT APPARATUS AND ALGORITHM

(71) Applicant: Silicon Laboratories Inc., Austin, TX (US)

(72) Inventor: John M. Khoury, Austin, TX (US)

(73) Assignee: Silicon Laboratories Inc., Austin, TX (US)

(*) Notice: Subject to any disclaimer, the term of this patent is extended or adjusted under 35 U.S.C. 154(b) by 250 days.

(21) Appl. No.: 17/486,044

(22) Filed: Sep. 27, 2021

(65) Prior Publication Data
US 2023/0025845 A1    Jan. 26, 2023

Related U.S. Application Data

(60) Provisional application No. 63/221,152, filed on Jul. 13, 2021.

(51) Int. Cl.
*H04W 4/02* (2018.01)
*G01S 11/02* (2010.01)

(52) U.S. Cl.
CPC ............. *H04W 4/023* (2013.01); *G01S 11/02* (2013.01)

(58) Field of Classification Search
CPC ................. H04W 4/023; G01S 11/02
USPC ........................................... 455/456.1
See application file for complete search history.

(56) References Cited

U.S. PATENT DOCUMENTS

| 8,340,682 | B2* | 12/2012 | Taylor | G01S 5/0289 |
| | | | | 455/456.1 |
| 11,228,860 | B2* | 1/2022 | Wang | H04W 4/023 |
| 2021/0250728 | A1* | 8/2021 | Wang | H04W 64/003 |

* cited by examiner

*Primary Examiner* — Thomas J Lett
(74) *Attorney, Agent, or Firm* — NIELDS, LEMACK & FRAME, LLC (57) ABSTRACT

A system and method for one-way ranging is disclosed. The system comprises a transmitter, also referred to as a tag, transmitting a first frequency in a first frequency group. The receiver, also referred to as the locator, receives the first frequency and measures the phase at a first point in time. At a later time, the transmitter switches to a second frequency, which is close in frequency to the first frequency so as to also be part of the first frequency group. The receiver also switches to the second frequency. The receiver then measures the phase of the second frequency at a second point in time. The transmitter and receiver then repeat this sequence for a second frequency group. The four phase measurements are used to determine the distance from the transmitter to the receiver. In this way, improved accuracy may be achieved by having a large separation between the first frequency group and the second frequency group.

21 Claims, 7 Drawing Sheets

ONE-WAY PHASE-BASED HIGH ACCURACY DISTANCE MEASUREMENT APPARATUS AND ALGORITHM

This application claims priority to U.S. Provisional Patent Application 63/221,152, filed Jul. 13, 2021, the disclosure of which is incorporated in its entirety.

FIELD

This disclosure describes systems and methods for determining a distance between network devices, and more particularly for determining a distance without establishing a connection between the network devices.

BACKGROUND

There is currently interest in expanding current network protocols to allow the possibility for a network device to determine the distance to another network device. For example, the Bluetooth specification is being modified to include High Accuracy Distance Measurement (HADM). As currently proposed, HADM discloses basic measurement techniques for two-way ranging. Two-way ranging requires the establishment and maintenance of a network connection between an initiator and a reflector. Since a network connection is established, security can be provided. However, by requiring a network connection, HADM is difficult to scale to a large number of network devices being tracked, from a single reference device.

Therefore, it would be beneficial if there were a system and method to determine the distance between two network devices without requiring the establishment of a network connection between these two network devices. Further, it would be advantageous if these system and method were as accurate as the current two-way HADM process.

SUMMARY

A system and method for one-way ranging is disclosed. The system comprises a transmitter, also referred to as a tag, transmitting a first frequency in a first frequency group. The receiver, also referred to as the locator, receives the first frequency and measures the phase at a first point in time. At a later time, the transmitter switches to a second frequency, which is close in frequency to the first frequency so as to also be part of the first frequency group. The receiver also switches to the second frequency. The receiver then measures the phase of the second frequency at a second point in time. The transmitter and receiver then repeat this sequence for a second frequency group. The four phase measurements are used to determine the distance from the transmitter to the receiver. In this way, improved resolution may be achieved by having a large separation between the first frequency group and the second frequency group.

According to one embodiment, a method of measuring a distance between two network devices is disclosed. The method comprises transmitting, from a first network device, a range detection signal, the range detection signal comprises a first frequency ($f_1$) and a second frequency ($f_2$) wherein a phase of the first frequency and the second frequency is constant; receiving, at a second network device, the range detection signal; determining, at the second network device, a phase of the first frequency and a phase of the second frequency, referred to as $\varphi_{T1}$ and $\varphi_{T2}$, respectively; and calculating a distance between the first network device and the second network device using values of $f_1$, $f_2$, $\varphi_{T1}$, and $\varphi_{T2}$, where the distance is an intra-frequency group distance measurement. In some embodiments, the first frequency is created using a common carrier frequency and a first adjustment frequency, and the second frequency is created using the common carrier frequency and a second adjustment frequency, wherein a phase of the first adjustment frequency and a phase of the second adjustment frequency are equal. In certain embodiments, the first adjustment frequency and the second adjustment frequency are created using a lookup table. In some embodiments, the second network device removes the common carrier frequency and the first adjustment frequency from the first frequency of the range detection signal, using a common receiver carrier frequency and a first receiver adjustment frequency, respectively, to determine the phase of the first frequency and removes the common carrier frequency and the second adjustment frequency from the second frequency of the range detection signal, using the common receiver carrier frequency and a second receiver adjustment frequency, respectively, to determine the phase of the second frequency. In certain embodiments, the method comprises transmitting, from the first network device, at least one additional frequency, wherein each additional frequency is generated using the common carrier frequency and an adjustment frequency; and determining, at the second network device, a phase of the at least one additional frequency and using the phase of the at least one additional frequency to calculate an intra-frequency group distance.

According to another embodiments, a method of measuring a distance between two network devices is disclosed. The method comprises transmitting, from a first network device, a first range detection signal, the first range detection signal comprises a first frequency ($f_1$) and a second frequency ($f_2$) wherein a phase of the first frequency and the second frequency is constant; receiving, at a second network device, the first range detection signal; determining, at the second network device, a phase of the first frequency and a phase of the second frequency, referred to as $\varphi_{T1}$ and $\varphi_{T2}$, respectively; transmitting, from a first network device, a second range detection signal, the second range detection signal comprises a third frequency ($f_3$) and a fourth frequency ($f_4$) wherein a phase of the third frequency and the fourth frequency is constant; receiving, at a second network device, the second range detection signal; determining, at the second network device, a phase of the third frequency and a phase of the fourth frequency, referred to as $\varphi_{T3}$ and $\varphi_{T4}$, respectively; and calculating a distance between the first network device and the second network device using values of $f_1$, $f_2$, $f_3$, $f_4$, $\varphi_{T1}$, $\varphi_{T2}$, $\varphi_{T3}$, and $\varphi_{T4}$, where the distance is an inter-frequency group distance measurement. In certain embodiments, the first frequency and the second frequency belong to a first frequency group, wherein a frequency group is defined as a set of frequencies generated using a common carrier frequency and wherein the third frequency and the fourth frequency belong to a second frequency group, different from the first frequency group and having a second common carrier frequency. In some embodiments, there is no phase relationship between the common carrier frequency and the second common carrier frequency. In some embodiments, the first frequency is created using the common carrier frequency and a first adjustment frequency, and the second frequency is created using the common carrier frequency and a second adjustment frequency, wherein a phase of the first adjustment frequency and a phase of the second adjustment frequency are equal. In some embodiments, the first adjustment frequency and the second adjustment frequency are created using a lookup table. In certain embodiments, the second network device removes the common carrier frequency and the first adjustment frequency from the first frequency of the first range detection signal, using a common receiver carrier frequency and a first receiver adjustment frequency, respectively, to determine the phase of the first frequency and removes the common carrier frequency and the second adjustment frequency from the second frequency of the first range detection signal, using the common receiver carrier frequency and a second receiver adjustment frequency, respectively, to determine the phase of the second frequency. In some embodiments, the inter-frequency group distance measurement is calculated based on an inter-frequency group phase difference, which is defined as a difference in total phase between the first network device and the second network device when transmitting and receiving the second range detection signal less a difference in total phase between the first network device and the second network device when transmitting and receiving the first range detection signal. In certain embodiments, the second network device performs an intra-frequency group distance measurement using only $f_1$, $f_2$, $\varphi_{T1}$, and $\varphi_{T2}$, and calculates a difference between the inter-frequency group distance measurement and the intra-frequency group distance measurement, adjusts the inter-frequency group phase difference by $2\pi$ if the difference is greater than a predetermined threshold, recalculates the inter-frequency group distance measurement using an adjusted inter-frequency group phase difference and repeats the adjusting and recalculating until the difference is less than the predetermined threshold.

According to another embodiments, a system for measuring a distance between two network devices is disclosed. The system comprises a first network device, configured to: transmit a first range detection signal, the first range detection signal comprises a first frequency ($f_1$) and a second frequency ($f_2$), wherein the first frequency and the second frequency belong to a first frequency group, wherein a frequency group is defined as a set of frequencies generated using a common carrier frequency and wherein a phase of the first frequency and the second frequency is constant; and a second network device, configured to: receive the first range detection signal; determine a phase of the first frequency and a phase of the second frequency, referred to as $\varphi_{T1}$ and $\varphi_{T2}$, respectively; and calculate a distance between the first network device and the second network device using values of $f_1$, $f_2$, $\varphi_{T1}$, and $\varphi_{T2}$, where the distance is an intra-frequency group distance measurement. In some embodiments, the first network device generates the first frequency using the common carrier frequency and a first adjustment frequency and generates the second frequency using the common carrier frequency and a second adjustment frequency, wherein a phase of the first adjustment frequency and a phase of the second adjustment frequency are equal. In certain embodiments, the first adjustment frequency and the second adjustment frequency are created using a lookup table. In some embodiments, the second network device removes the common carrier frequency and the first adjustment frequency from the first frequency of the first range detection signal, using a common receiver carrier frequency and a first receiver adjustment frequency, respectively, to determine the phase of the first frequency and removes the common carrier frequency and the second adjustment frequency from the second frequency of the first range detection signal, using the common receiver carrier frequency and a second receiver adjustment frequency, respectively, to determine the phase of the second frequency.

In certain embodiments, the first network device is further configured to: transmit a second range detection signal, the second range detection signal comprises a third frequency ($f_3$) and a fourth frequency ($f_4$) wherein a phase of the third frequency and the fourth frequency is constant; and wherein the second network device is further configured to: receive the second range detection signal; determine a phase of the third frequency and a phase of the fourth frequency, referred to as $\varphi_{T3}$ and $\varphi_{T4}$, respectively; and calculate a distance between the first network device and the second network device using values of $f_1$, $f_2$, $f_3$, $f_4$, $\varphi_{T1}$, $\varphi_{T2}$, $\varphi_{T3}$, and $\varphi_{T4}$, where the distance is an inter-frequency group distance measurement. In some embodiments, the first network device uses a second common carrier frequency, different from the common carrier frequency to generate the third frequency and the fourth frequency. In some embodiments, the second network device calculates the inter-frequency group distance measurement based on an inter-frequency group phase difference, which is defined as a difference in total phase between the first network device and the second network device when transmitting and receiving the second range detection signal less the difference in total phase between the first network device and the second network device when transmitting and receiving the first range detection signal. In certain embodiments, the second network device performs an intra-frequency group distance measurement using only $f_1$, $f_2$, $\varphi_{T1}$, and $\varphi_{T2}$, and calculates a difference between the inter-frequency group distance measurement and the intra-frequency group distance measurement, adjusts the inter-frequency group phase difference by $2\pi$ if the difference is greater than a predetermined threshold and recalculates the inter-frequency group distance measurement using an adjusted inter-frequency group phase difference and repeats the adjusting and recalculating until the difference is less than the predetermined threshold.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
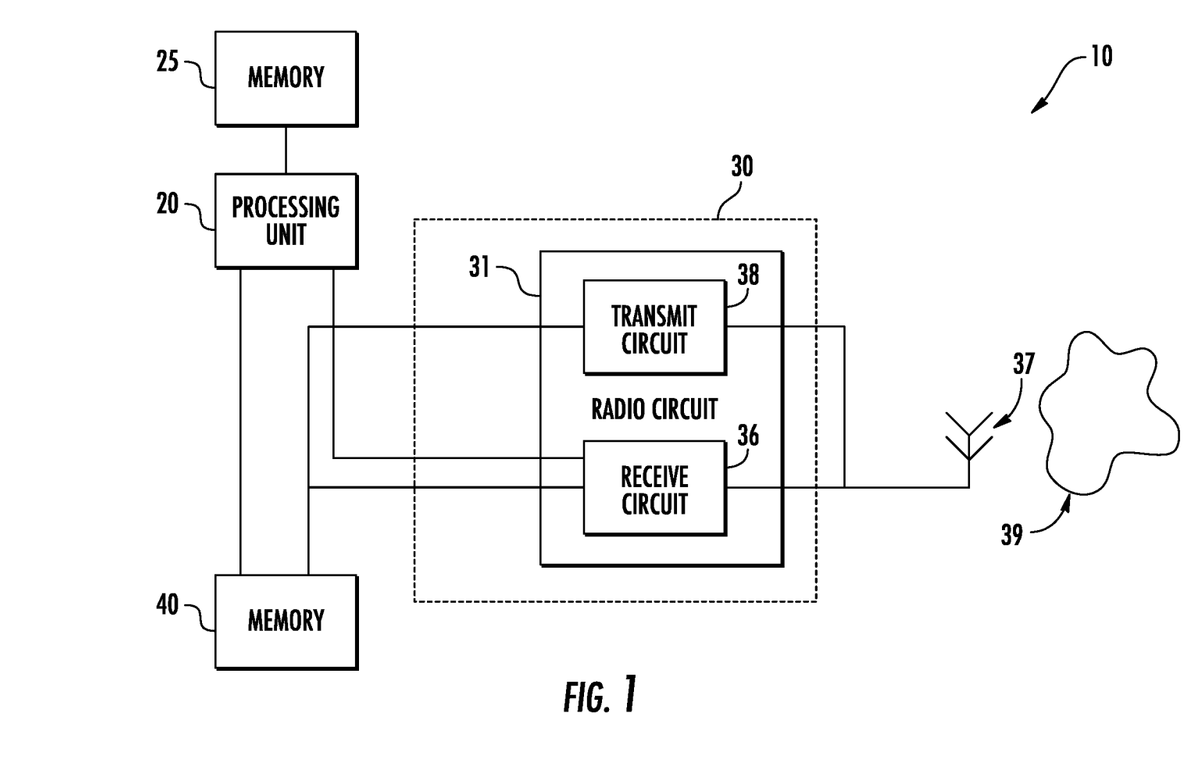
FIG. 1 is a block diagram of a network device that may be used to perform the method described herein.

FIG. 1 shows a network device that may be used to perform the range detection algorithm described herein. The network device 10 has a processing unit 20 and an associated memory device 25. The processing unit 20 may be any suitable component, such as a microprocessor, embedded processor, an application specific circuit, a programmable circuit, a microcontroller, or another similar device. The memory device 25 contains the instructions, which, when executed by the processing unit 20, enable the network device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM. The instructions contained within the memory device 25 may be referred to as a software program, which is disposed on a non-transitory storage media.

The network device 10 also includes a network interface 30, which may be a wireless network interface that includes an antenna 37. The network interface 30 may support any wireless network protocol that supports range detection, such as Bluetooth. The network interface 30 is used to allow the network device 10 to communicate with other devices disposed on the network 39.

The network interface 30 include radio circuit 31. This radio circuit 31 is used to process the incoming signal and convert the wireless signals to digital signals. The components within the radio circuit 31 are described in more detail below.

The radio circuit 31 includes a receive circuit 36. The receive circuit 36 is used to receive, synchronize and decode the digital signals received from the antenna 37. Specifically, the receive circuit 36 has a preamble detector that is used to identify the start of an incoming packet. The receive circuit 36 also has a sync detector, which is used to identify a particular sequence of bits that are referred to as a sync character. Additionally, the receive circuit 36 has a decoder which is used to convert the digital signals into properly aligned bytes of data.

The radio circuit 31 also includes a transmit circuit 38. The transmit circuit 38 may include a power amplifier that is used to supply a signal to be transmitted to the antenna 37.

The network device 10 may include a second memory device 40. Data that is received from the network interface 30 or is to be sent via the network interface 30 may also be stored in the second memory device 40. This second memory device 40 is traditionally a volatile memory.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language, which is not limited by this disclosure. Thus, in some embodiments, there may be multiple computer readable non-transitory media that contain the instructions described herein. The first computer readable non-transitory media may be in communication with the processing unit 20, as shown in FIG. 1. The second computer readable non-transitory media may be a CDROM, or a different memory device, which is located remote from the network device 10. The instructions contained on this second computer readable non-transitory media may be downloaded onto the memory device 25 to allow execution of the instructions by the network device 10.

While the processing unit 20, the memory device 25, the network interface 30 and the second memory device 40 are shown in FIG. 1 as separate components, it is understood that some or all of these components may be integrated into a single electronic component. Rather, FIG. 1 is used to illustrate the functionality of the network device 10, not its physical configuration.

Although not shown, the network device 10 also has a power supply, which may be a battery or a connection to a permanent power source, such as a wall outlet.

Having described the basic architecture of the network device, a description of the one way ranging procedure will be provided.

Figure 2A:
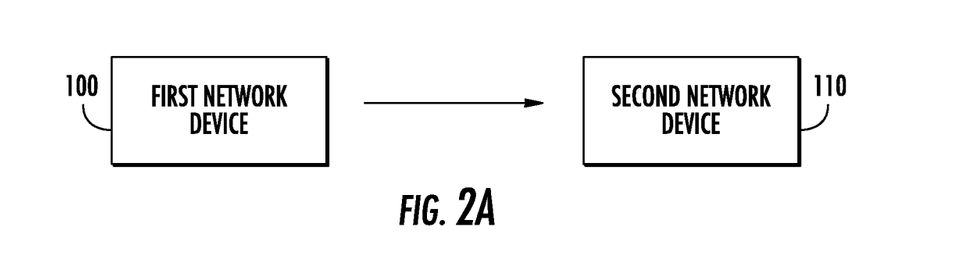
FIG. 2A shows a first network device transmitting a range detection signal to a second network device.
Figure 2B:
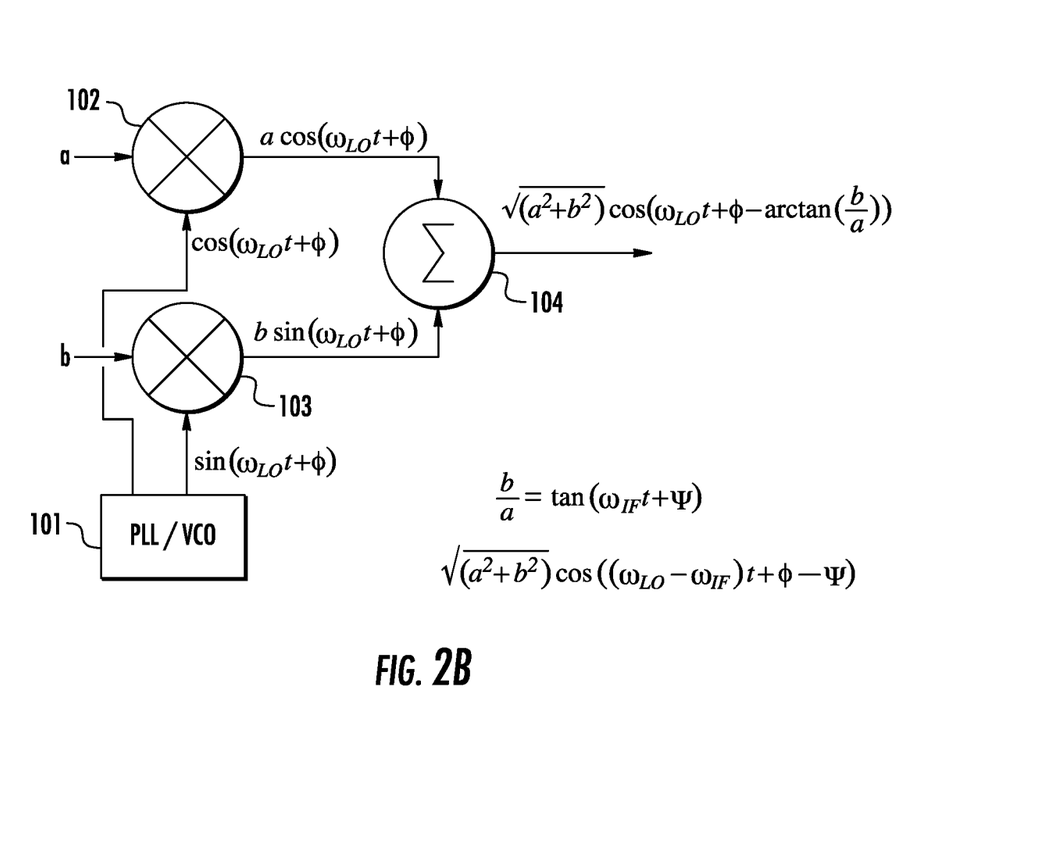
FIG. 2B show the principle of operation for the frequency generator.

First, referring to FIG. 2A, assume a first network device 100, also referred to as the tag, or transmitter, transmits a signal to the second network device 110, also referred to as the locator or receiver. FIG. 2B shows the principle of operation of this system and method.

A phase locked loop or voltage controlled oscillator (PLL/VCO) 101 is used to generate a first signal having a first frequency ($\omega_{LO}$) and a first phase ($\varphi$). The cosine of this first signal is supplied to a first multiplier 102 and the sine of this first signal is supplied to a second multiplier 103. A second signal, labelled a, is also supplied to the first multiplier 102, while a third signal, labelled b, is supplied to the second multiplier 103. Thus, as shown in FIG. 2B, the output from the first multiplier 102 can be written as a*cos($\varphi_{LO}$t+$\varphi$) while the output from the second multiplier may be written as b*sin($\varphi_{LO}$t+$\varphi$). These two outputs are then added using summing junction 104. The result of this can be expressed as:

$$\sqrt{a^2+b^2} * \cos\left(\omega_{LO}t + \varphi - \arctan\left(\frac{b}{a}\right)\right)$$

If b/a is defined as tan($\omega_{IF}$t+$\psi$), then the above equation may be rewritten as:

$$\sqrt{a^2+b^2}*\cos((\omega_{LO}-\omega_{IF})t+\varphi-\psi)$$

Thus, by proper selection of a and b, the frequency of the output of the summing junction 104 may be modified, either positively or negatively. Further, if a and b are generated using a lookup table, it is possible to change the frequencies of a and b while maintaining phase.

For example, assume that a and b are first set to cos ($\omega_{IF}$t+$\psi$) and sin ($\omega_{IF}$t+$\psi$), respectively, and then switched to cos ($-\omega_{IF}$t+$\psi$) and sin ($-\omega_{IF}$t+$\psi$), respectively. In this way, the transmitted frequencies will be $\sqrt{a^2+b^2}*\cos((\omega_{LO}-\omega_{IF})t+\varphi-\psi)$ and $\sqrt{a^2+b^2}*\cos((\omega_{LO}-\omega_{IF})t+\varphi-\psi)$, with constant phase. Thus, it is readily seen that two frequencies, separated by a small frequency (i.e., 2$\omega_{IF}$) can be generated with constant phase.

Using the principle shown in FIG. 2B, it is possible to generate a plurality of frequency groups. A frequency group is defined as a set of closely grouped frequencies, which may be generated using a common output from the PLL 101. For example, using a lookup table, a and b can set to a plurality of frequencies, such as between −5 MHz and +5 MHz. In other embodiments, using a lookup table, a and b can set to a plurality of frequencies between −3 MHz and +3 MHz. Thus, for a first frequency group, the PLL 101 may be set to 2.4 GHz, and the output frequencies may be between 2.397 GHz and 2.403 GHz. For a second frequency group, the PLL 101 may be set to 2.48 GHz, and the output frequencies may be between 2.477 GHz and 2.483 GHz.

By using frequency groups that have a narrow range of frequencies, the settings for the transmit circuit 38 may be maintained through the transmission of the signals.

Figure 3:
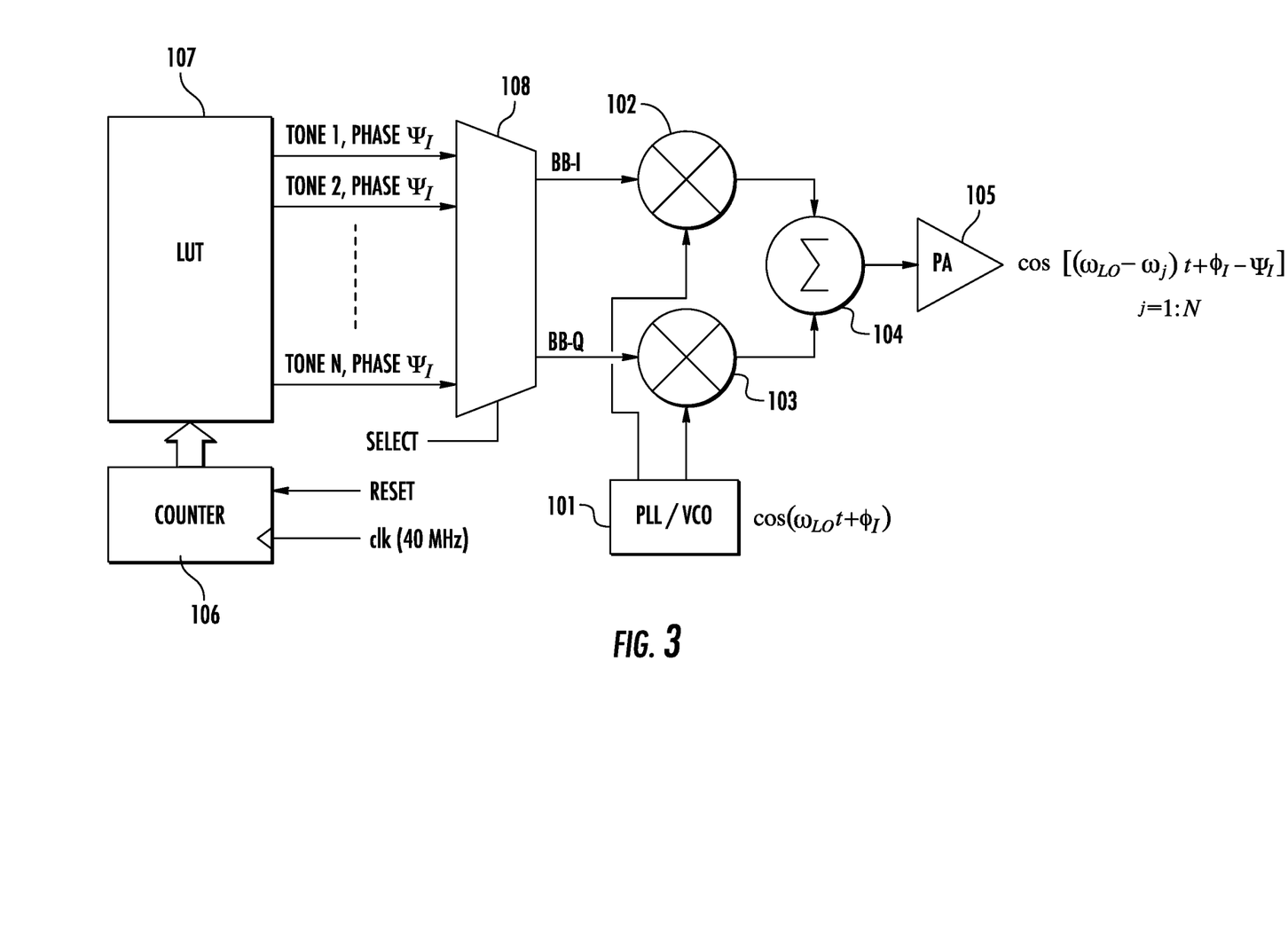
FIG. 3 shows a transmit circuit according to one embodiment of the network device of FIG. 1.

FIG. 3 shows a transmit circuit 38 that may be used by the first network device 100 to implement the block diagram shown in FIG. 2B. As described above, a controlled oscillator (PLL/VCO) 101 is used to generate a first signal having a first carrier frequency ($\omega_{LO}$) and a first phase ($\varphi_i$). The cosine of this first signal is supplied to a first multiplier 102 and the sine of this first signal is supplied to a second multiplier 103. A counter 106 is used to index into a lookup table 107, which may be a random access memory device or a read only memory. In certain embodiments, a plurality of outputs are created by the lookup table 107, wherein each of the outputs has the same phase such that there is a constant phase for all of the outputs. These outputs may be in the form $\sin(\omega_j t+\psi_i)$ and $\cos(\omega_j t+\psi_i)$. The outputs from the lookup table 107 are used as the inputs to a multiplexer 108. These outputs may be referred to as adjustment frequencies. The multiplexer selects one pair of these adjustment frequencies, which are the cosine and sine of the same frequency ($\psi_j$). This pair of inputs is then passed to the first multiplier 102 and the second multiplier 103, respectively. These two outputs are then added using summing junction 104. The output from the summing junction 104 is then transmitted using power amplifier 105. The output frequency and phase of the power amplifier 105 can be expressed as:

$$\cos((\omega_{LO}-\omega_j)t+\varphi_i-\psi_i)$$

where $\omega_j$ is selected by the multiplexer 108 using the select signal.

Figure 4:
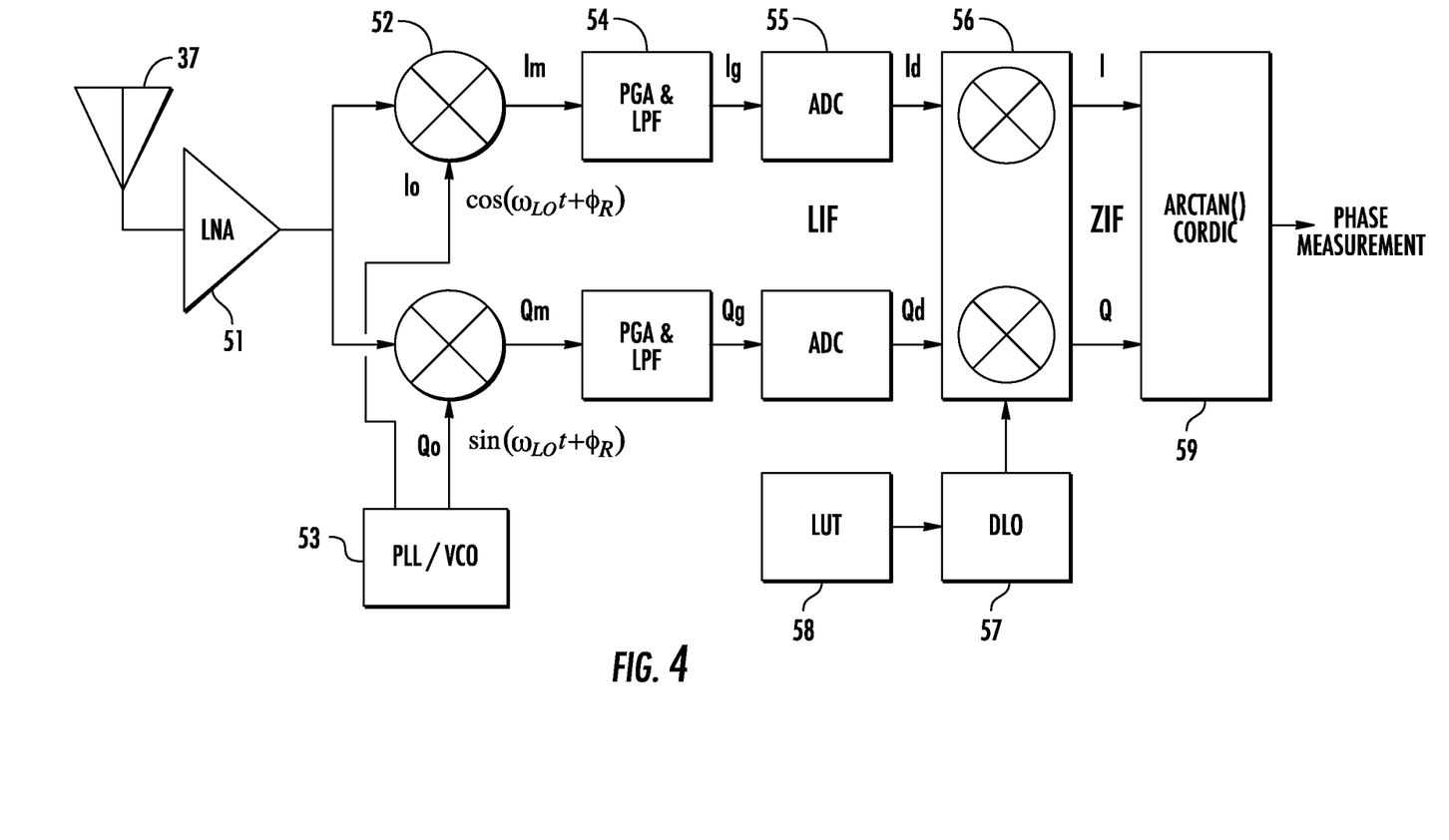
FIG. 4 is a block diagram of the receive circuit of the network device of FIG. 1.

Similarly, constant phase must be maintained at the second network device 110 as well. FIG. 4 shows a block diagram of the receive circuit 36. The wireless signals first enter the receive circuit 36 through the antenna 37. This antenna 37 is in electrical communication with a low noise amplifier (LNA) 51. The LNA 51 receives a very weak signal from the antenna 37 and amplifies that signal while maintaining the signal-to-noise ratio (SNR) of the incoming signal. The amplified signal is then passed to two mixers 52. The mixers 52 are also in communication with a local oscillator, such as PLL 53, which provides two phases to the mixers 52. The frequency of the PLL 53 is ($\omega_{LO}$) and the phase may be ($\varphi_R$). The frequency of the PLL 53 may be referred to as the receiver carrier frequency. The cosine of the frequency may be referred to as $I_o$, while the sine of the frequency may be referred to as $Q_o$. The $I_o$ signal is then multiplied by the incoming signal to create the inphase signal, $I_m$. The $Q_o$ signal is then multiplied by the incoming signal to create the quadrature signal, $Q_m$. The inphase signal, $I_m$, and the quadrature signal, $Q_m$, from the mixers 52 are then fed into programmable gain amplifiers (PGA) 54. The PGA 54 amplifies the $I_m$ and $Q_m$ signals by a programmable amount. These amplified signals are referred to as $I_g$ and $Q_g$. The PGA 54 may also include a low pass filter. The amplified signals, $I_g$ and $Q_g$, are then fed from the PGA 54 into an analog to digital converter (ADC) 55. The ADC 55 converts these analog signals to digital signals, $I_d$ and $Q_d$. These digital signals may pass through a second mixer 56. The other input to the second mixer 56 is the output from a digital local oscillator 57. The digital local oscillator 57 is fed by a lookup table 58, which may be similar to the lookup table shown in FIG. 3. The output from the digital local oscillator 57 may be a signal having a frequency of $\omega_j$ and a phase of $\psi_R$. This may be referred to as an adjustment frequency. The outputs from the second mixer 56 then exit the receive circuit 36 as I and Q. In certain embodiments, the I and Q values maybe considered complex numbers, wherein the I value is the real component and the Q value is the imaginary component.

The I and Q signals then enter a CORDIC (Coordination Rotation Digital Computer) 59, which determines the amplitude and phase of the signals. Amplitude is given as the square root of $I^2$ and $Q^2$, while phase is given by the $\tan^{-1}$ (Q/I). The CORDIC 59 may be disposed in the radio circuit 31, or elsewhere within the network interface 30. Referring to FIGS. 2-4, it can be seen that the resulting phase may be $\varphi_I-\psi_I+\theta_p-\varphi_R+\psi_R$, wherein $\varphi_I$ is the phase of the PLL 101 in the first network device 100, $\psi_I$ is the phase of the lookup table 107 in the first network device, $\theta_p$ is the phase delay caused by the transmission of the signal, $\varphi_R$ is the phase of the PLL 53 in the second network device 110, and $\psi_R$ is the phase of the lookup table 58 in the second network device 110.

Thus, if a signal is transmitted by the first network device 100 that has two different frequencies within a single frequency group, and received by the second network device 110, the following relationships exist:

$\varphi_{T1}=\varphi_I-\psi_I+\theta_{p1}-\varphi_R+\psi_R$, where $\varphi_{T1}$ is the phase delay measured at the second network device using the first frequency, $f_1$; and $\varphi_{T2}=\varphi_I-\psi_I+\theta_{p2}-\varphi_R+\psi_R$, where $\varphi_{T2}$ is the phase delay measured at the second network device using the second frequency, $f_2$.

Since the PLL 101 maintains the same frequency for both frequencies in the frequency group, $\varphi_I$ is constant for both frequencies. Similarly, since the PLL 53 maintains the same frequency for both frequencies in the frequency group, $\varphi_R$ is constant for both frequencies. Further, since there is constant phase in the lookup table 107, $\psi_I$ is constant for both frequencies. Similarly, since there is constant phase in the lookup table 58, $\psi_R$ is constant for both frequencies. Thus, $\varphi_{T1}-\varphi_{T2}=\theta_{p1}-\theta_{p2}$.

In other words, by creating a constant phase between frequencies $f_1$ and $f_2$ in the lookup tables and maintaining the PLL at a constant frequency, it is possible to determine the distance between two network devices. The equation for distance can be expressed as:

$$d=c(\varphi_{T1}-\varphi_{T2})/2\pi(f_1-f_2), \text{ where } c \text{ is the speed of light.}$$

Additionally, using these equations, the phase difference between the transmitter ($\varphi_I-\psi_I$) and the receiver ($\varphi_R-\psi_R$) can be determined as:

$(\varphi_I-\psi_I)-(\varphi_R-\psi_R)=((N2/N1*\varphi_{T1})-\varphi_{T2})/(N2/N1-1)$, wherein N2/N1 is the ratio of the second frequency ($f_2$) to the first frequency ($f_1$).

If a plurality of measurements are made, these results may be averaged to yield an average phase difference ($\varphi_{IR}$) between the transmitter and the receiver for a particular frequency group.

While this equation is very useful for finding distances, it is noted that the difference between $f_1$ and $f_2$ may only be a few MHz. This closeness may limit the accuracy of this calculation, especially at smaller distances.

Therefore, to improve the accuracy of the distance calculations, it may be beneficial to have a larger spread between the different frequencies. One approach to address this issue is to utilize a second frequency group.

Figure 5:
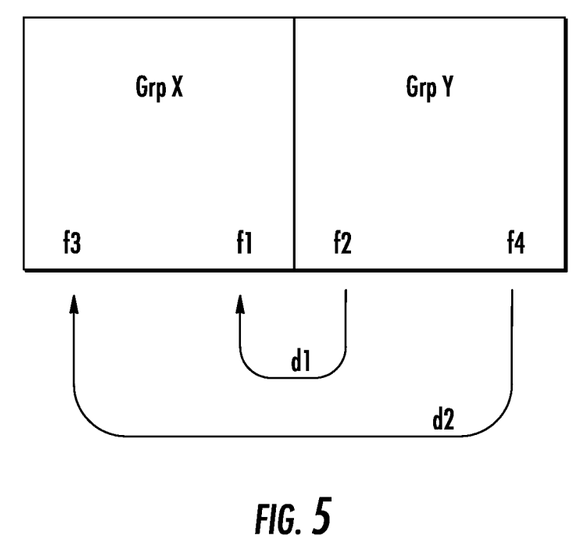
FIG. 5 shows the use of two frequency groups for distance calculations.

FIG. 5 shows an example where two frequency groups, labelled X and Y are used. In this example, f1 and f3 are part of frequency group X, while f2 and f4 are part of frequency group Y. In some embodiments, the two frequency groups may be separated by 10 MHz or more. In certain embodiments, the frequency groups may be separated by 20 MHz or more. Note that in some embodiments, there is no phase relationship between these different frequency groups. A first distance may be calculated using frequencies f1 and f2. This distance may be expressed as:

$$d_1 = \frac{c}{2\pi}\left[\frac{\varphi_{T2} - \varphi_{T1}}{f_2 - f_1}\right] - \frac{c}{2\pi}\left[\frac{\varphi_{IRY} - \varphi_{IRX}}{f_2 - f_1}\right] \quad (1)$$

where $\varphi_{IRY} = (\varphi_{IY} * \psi_{IY}) - (\varphi_{RY} - \psi_{RY})$, $\varphi_{IY}$ is the phase of the PLL 101 when used in the second frequency group, $\psi_{IY}$ is the phase of the lookup table 107 when used in the second frequency group, $\varphi_{RY}$ is the phase of the PLL 53 when used in the second frequency group, $\psi_{IY}$ is the phase of the lookup table 58 when used in the second frequency group, $\varphi_{T2}$ is the phase measured by the second network device when receiving $f_2$, and $\varphi_{T1}$ is the phase measured by the second network device when receiving $f_1$.

Further, $\varphi_{IRX} = (\varphi_{IX} - \psi_{IX}) - (\varphi_{RX} - \psi_{RX})$ where these variables are as described above for the first frequency group.

A second distance may be calculated using frequencies f3 and f4. This distance may be expressed as:

$$d_2 = \frac{c}{2\pi}\left[\frac{\varphi_{T4} - \varphi_{T3}}{f_4 - f_3}\right] - \frac{c}{2\pi}\left[\frac{\varphi_{IRY} - \varphi_{IRX}}{f_4 - f_3}\right] \quad (2)$$

Wherein $\varphi_{T4}$ is the phase measured by the second network device when receiving $f_4$, and $\varphi_{T3}$ is the phase measured by the second network device when receiving $f_3$.

Note that d1 and d2 should be equal. Therefore, if these equations are set equal to one another, the following result can be obtained:

$$\varphi_{IRY} - \varphi_{IRX} = \frac{\left[\frac{\varphi_{T2} - \varphi_{T1}}{f_2 - f_1}\right] - \left[\frac{\varphi_{T4} - \varphi_{T3}}{f_4 - f_3}\right]}{\frac{1}{f_2 - f_1} - \frac{1}{f_4 - f_3}} \quad (3)$$

The above relationships can be expressed differently. Equation (1) can be rewritten as:

$$d_{1raw} = d_{1actual} + \frac{c}{2\pi}\left[\frac{\varphi_{IRY} - \varphi_{IRX}}{f_2 - f_1}\right] \quad (4)$$

where $$d_{1raw} = \frac{c}{2\pi}\left[\frac{\varphi_{T2} - \varphi_{T1}}{f_2 - f_1}\right],$$

which can be easily calculated.

Similarly, equation (2) can be rewritten as:

$$d_{2raw} = d_{2actual} + \frac{c}{2\pi}\left[\frac{\varphi_{IRY} - \varphi_{IRX}}{f_4 - f_3}\right] \quad (5)$$

where $$d_{2raw} = \frac{c}{2\pi}\left[\frac{\varphi_{T4} - \varphi_{T3}}{f_4 - f_3}\right],$$

which can also be easily calculated.

The raw distances each comprise two terms. The first term represents the actual distance (which are equal), but the second term represents an unknown that is due to the unknown phase relationship between the transmitters and receivers in frequency groups X and Y. By subtracting equation (5) from equation (4), the actual distance is cancelled and the phase difference between frequency group X and Y can be determined.

Subtracting equation (5) from equation (4) yields:

$$\varphi_{IRY} - \varphi_{IRX} = \frac{2\pi(d_{1raw} - d_{2raw})}{c\left[\frac{1}{f_2 - f_1} - \frac{1}{f_4 - f_3}\right]} \quad (6)$$

Since all of the terms on the right side of equation (3) and equation (6) are known or can be measured, these equations can be solved to obtain $\varphi_{IRY} - \varphi_{IRX}$. This value may be referred to as the inter-frequency group phase difference. The inter-frequency group phase difference can then be substituted into either of the distance equations (1) or (2) to yield the actual distance between the two network devices. Since two different frequency groups are used to calculate this distance, this distance may be referred to as an inter-frequency group distance measurement.

Note that FIG. 5 shows $f_1$ and $f_2$ having the smaller frequency spread, while $f_3$ and $f_4$ are more separated. This configuration may be useful as it maximizes the frequency difference and results in lower sensitivity when calculating the phase difference of frequency group X and frequency group Y. However, other configurations are possible. For example, the above equations may have been generated using $f_1$ and $f_4$ and $f_2$ and $f_3$, if desired. In other words, the only requirement is that $f_1$ and $f_3$ belong to the same frequency group and $f_2$ and $f_4$ belong to the same frequency group. Further, as described above, frequencies within a given frequency group have the same phase, while in some embodiments, there may be no phase relationship between frequency groups.

Figure 6:
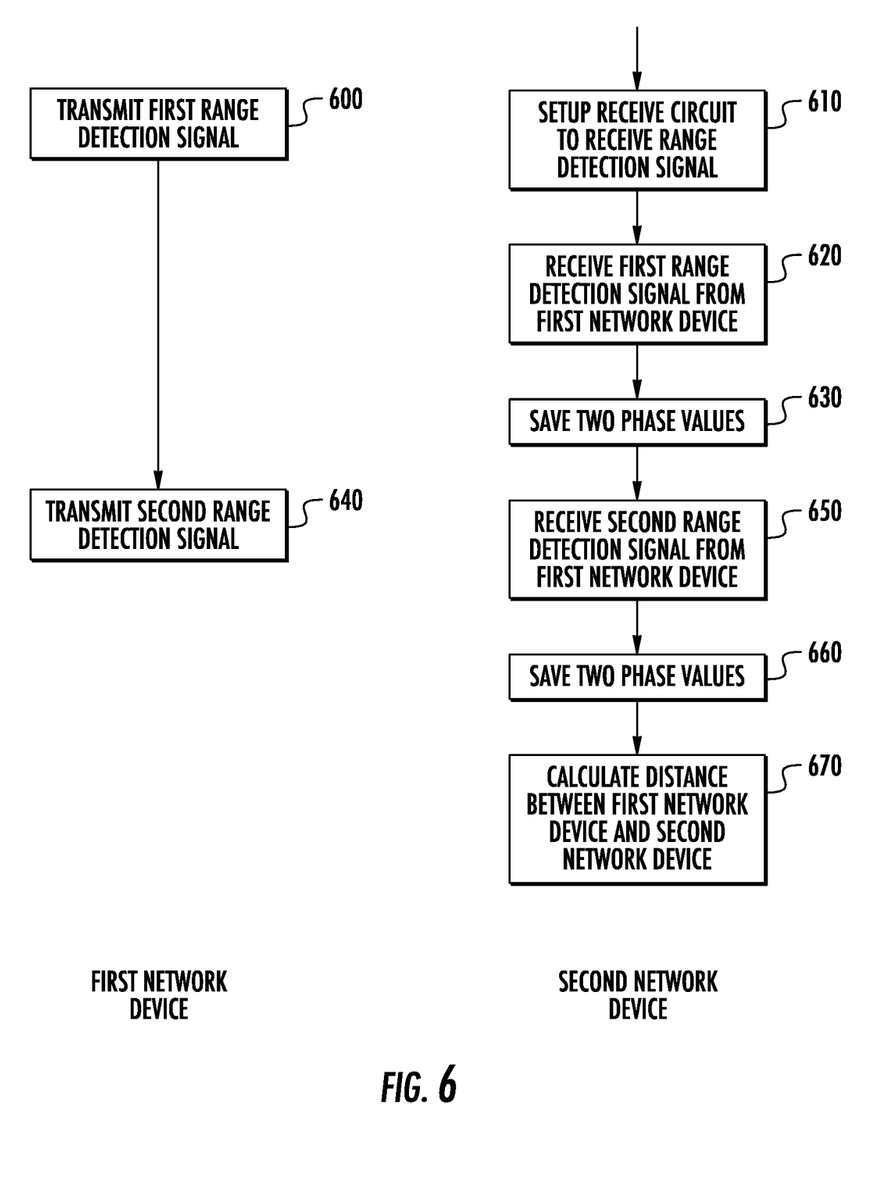
FIG. 6 shows a flowchart describing the operation of two network devices.

Thus, in this embodiment, the following steps are performed, as shown in FIG. 6. First, as shown in Box 600, the first network device 100 transmits a first range detection signal having two frequencies that are contained within the first frequency group. In certain embodiments, the network interface 30 operates on a wireless network that utilizes the Bluetooth network protocol. In this embodiment, the range detection signal may comprise a preamble, which is used to synchronize the clock of the receiver to the frequency and phase of the incoming signal. Next, a sync character may follow. The sync character is a predetermined sequence of bits that are used to denote the boundary between symbols. The sync character described above may be equivalent to the 32-bit "Access Address" in a BLE packet. Following the sync character may be a header. The header may include information, such as the identity of the network device transmitting this range detection signal. Following the header may be a first constant tone having the first frequency. Lastly, a second constant tone having the second frequency is transmitted. Note that a frequency group may comprise 2 or more frequencies.

The second network device 110 sets up the receive circuit 36 to receive this first range detection signal, as shown in Box 610. The second network device 110 then receives this first range detection signal, as shown in Box 620. The second network device 110 then samples the phase during the first constant tone and during the second constant tone, as shown in Box 630. In certain embodiments, each constant tone is transmitted for a predetermined duration. In certain embodiments, the time between when the second network device 110 samples the first constant tone and the second constant tone is equal to this predetermined duration. These measured phase samples may be referred to as $\varphi_{T1}$ and $\varphi_{T3}$, respectively.

As shown in Box 640, the first network device 100 then transmits a second range detection signal having two frequencies that are contained within the second frequency group, different from the first frequency group. The first network device 100 may alter the frequency and phase of the PLL 101 before transmitting this second range detection signal.

As shown in Box 650, the second network device 110 receives this second range detection signal. Although not shown, the second network device 110 may alter the settings in the receive circuit 36 to accommodate the frequencies that are being transmitted in the second range detection signal. The second network device 110 samples the phase during the first constant tone and during the second constant tone, as shown in Box 660. These samples may be referred to as $\varphi_{T2}$ and $\varphi_{T4}$, respectively.

As shown in Box 670, the second network device 110 then calculates the distance between the first network device 100 and the second network device 110. This calculation may require a plurality of calculations, as described above. For example, the second network device may calculate the value of the inter-frequency group phase difference using the equation (3) given above. Once this value is known, the second network device may use this value in one of the distance equations (1) or (2) given above to find the distance between the second network device and the first network device.

In many embodiments, the sequence described above is sufficient to obtain the distance between the two network devices. However, in certain embodiments, the inter-frequency group phase difference obtained from equation (3) may be incorrect, as it neglects to take into account phase wrapping.

Consequently, if the result found in equation (3) is incorrect, the distance, as calculated using equation (1) or equation (2) may also be incorrect. Thus, in certain embodiments, there is a need to compensate for phase wrapping.

Figure 7:
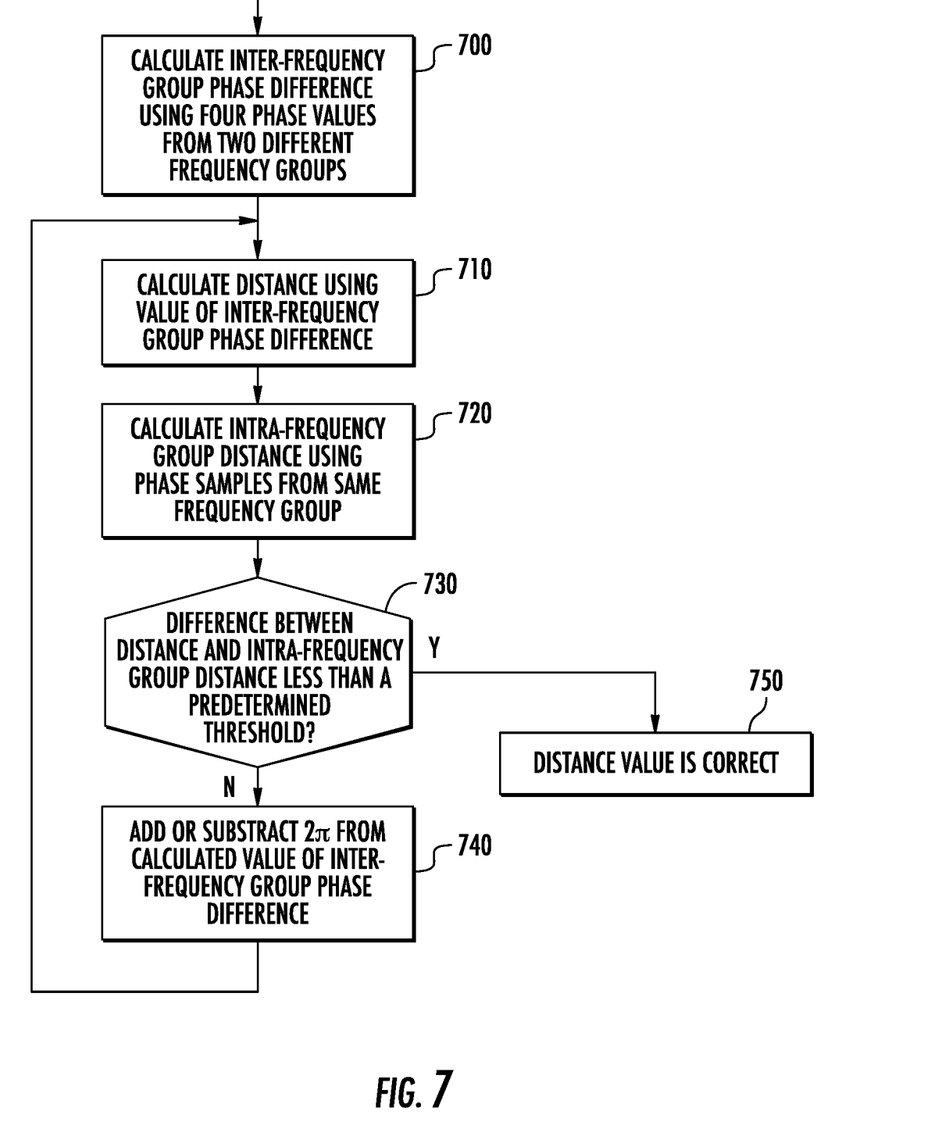
FIG. 7 shows a flowchart describing how to compensate for phase wrap.

Thus, in certain embodiments, the process described in Box 670 may be more complex. For example, FIG. 7 shows one embodiment that may be used to compensate for phase wrapping.

First, as described above, and shown in Box 700, the value of the inter-frequency group phase difference is determined. This value can then be plugged into either of the distance equations (1) or (2) to yield the theoretical distance between the two network devices, as shown in Box 710. As a sanity check, a distance calculation may be performed using frequencies within the same frequency group. Note that there are no issues with phase wrap for frequencies within the same frequency group, as the phase remains constant and the distance is limited to a range consistent with the frequency separation. Thus, in certain embodiments, the approximate distance is calculated using two frequencies from the same frequency group, as shown in Box 720. This distance may be referred to as an intra-frequency group distance measurement. This value will provide an indication of the actual distance, but may lack accuracy, depending on the distance between the two network devices.

The approximate or intra-frequency group distance is then compared to the calculated distance, as shown in Box 730. If the calculated distance and the intra-frequency group distance are within a predetermined threshold, it is assumed that the calculated value is correct, as shown in Box 750. The sequence is then complete.

If, however, the difference between the intra-frequency group distance and the calculated distance is greater than the predetermined threshold, it is assumed that phase wrap has occurred. To compensate for this, the calculated value of the inter-frequency group phase difference is incremented or decremented by $2\pi$, as shown in Box 740. For example, if the intra-frequency group distance is greater than the calculated distance, $2\pi$ may be added to the inter-frequency group phase difference. Additionally, if the intra-frequency group distance is less than the calculated distance, $2\pi$ may be subtracted from the inter-frequency group phase difference.

The sequence then continues by repeating the steps shown in Boxes 710-740 until the difference between the intra-frequency group distance and the calculated distance is less than the predetermined threshold.

In certain embodiments, the predetermined threshold may be a small value, such as 1 meter. In other embodiments, a slightly larger threshold may be utilized.

There are additional modifications that may be performed to improve the accuracy of this distance measurement. For example, if the frequency of the transmitter differs from the receiver by a small amount (e.g. less than 80 ppm), the locator can measure this frequency error and compensate the phase calculation based on this frequency error. One compensation method is to take two or more phase measurements over a known time interval and the resulting phase measurement will increase (or decrease) with each successive measurement from which the frequency error can be calculated and removed from the desired phase measurement by extrapolating the phase measurement back to a given instant in time. Alternatively, the receiver can measure the frequency error and modify the frequency of PLL 53 to match that of the PLL 101 and after a settling interval, then measure the phase. Other techniques known in the art may be applied.

For example, the above system and method relies on the phase of two transmitted signals, each having two different frequencies. The phase delay from the antenna through the receive circuit 38 to the ADC 55 may differ depending on frequencies. For example, the phase delay due to the components, such as capacitors and inductors, in the path is a function of frequency. This collection of components may be referred to as the receive group, or Rx group. Therefore, in certain embodiments, the Rx group is calibrated at each frequency that is used for range detection signals. The Rx group delay may be calibrated in a number of ways. For example, the calibration may be performed by the chip manufacturer and provided to the user. In another embodiment, the calibration results may be stored in a one-time programmable (OTP) portion of memory. In another embodiment, the user may perform the calibration and save the results.

In all of these embodiments, the phase difference that is caused by the Rx group delay may be calculated and taken into consideration when calculating the actual phase of the first signal and the second signal.

Additionally, another source of error may be phase delay introduced by the transmit circuit 38 of the first network device 100. This phase error may be calculated in a number of ways. For example, the calibration may be performed by the chip manufacturer and the phase delays for each frequency may be provided to the user. In another embodiment, the calibration results may be stored in a nonvolatile memory. In another embodiment, the user may perform the calibration and save the results. For example, a calibration station may be used to receive the frequencies of interest from the first network device. The calibration station can then measure the difference in phase between these two frequencies. This difference can then be stored in a NVM portion of memory. In yet another embodiment, a loop back test may be performed where the transmit circuit 38 of the first network device are both in communication with the antenna. The first network device transmits the two frequencies of interest sequentially and simultaneously measures the phase of each of these frequencies as received by the receive group to calculate the phase delay associated with transmission. The result of this calculation may be referred to as the transmitter phase correction.

The distance from a first network device 100 to a second network device 110 may be used for many applications. For example, the range detection may be used in conjunction with angle of arrival or departure algorithms. For example, by determining an angle of arrival and the distance to the first network device 100, it is possible for the second network device 110 to estimate the three-dimensional position of the first network device 100. This location information may be used in a plurality of ways. For example, if a first network device (or tag) is installed on each of a plurality of assets in a warehouse, the second network device (or locator) may be able to identify the location of a specific asset. In some embodiments, there may be multiple locators (receivers), which each measure their distance to tag (transmitter). The locators send their measurements to a master locator (or another processing unit) that uses the locators' known positions and distance measurements to calculate tag position as the intersection of multiple spheres, similar to GPS. Further, there are applications beyond industrial asset tracking. For example, the two network devices may also operate as a proximity sensor. For example, when the user (holding a tag) approaches an automobile (acting as a locator), the doors may automatically unlock. This concept can be expanded to zone creation, where an event is triggered when a user enter/exits a geographical zone. Additionally, this system of network devices may also be used to track pets or locate personal objects.

The present system and method have many advantages. First, this system and method does not require a network connection between the first network device and the second network device. Because of this, the second network device is able to track many more devices than would be possible if the second network device was required to establish a network connection with each. Thus, the present system and method are far more scalable than two-way range detection systems. Further, the system and method described herein allow the use of frequencies that are separated by many MHz. This may improve the accuracy of the measurements, especially at short distances.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of measuring a distance between two network devices, comprising:
    transmitting, from a first network device, a range detection signal, the range detection signal comprises a first frequency ($f_1$) and a second frequency ($f_2$) wherein a phase of the first frequency and the second frequency is constant;
    receiving, at a second network device, the range detection signal;
    determining, at the second network device, a phase of the first frequency and a phase of the second frequency, referred to as $\varphi_{T1}$ and $\varphi_{T2}$, respectively; and
    calculating a distance between the first network device and the second network device using values of $f_1$, $f_2$, $\varphi_{T1}$, and $\varphi_{T2}$, where the distance is an intra-frequency group distance measurement.

2. The method of claim 1, wherein the first frequency is created using a common carrier frequency and a first adjustment frequency, and the second frequency is created using the common carrier frequency and a second adjustment frequency, wherein a phase of the first adjustment frequency and a phase of the second adjustment frequency are equal.

3. The method of claim 2, wherein the second network device removes the common carrier frequency and the first adjustment frequency from the first frequency of the range detection signal, using a common receiver carrier frequency and a first receiver adjustment frequency, respectively, to determine the phase of the first frequency and removes the common carrier frequency and the second adjustment frequency from the second frequency of the range detection signal, using the common receiver carrier frequency and a second receiver adjustment frequency, respectively, to determine the phase of the second frequency.

4. The method of claim 2, further comprising:
    transmitting, from the first network device, at least one additional frequency, wherein each additional frequency is generated using the common carrier frequency and an adjustment frequency; and
    determining, at the second network device, a phase of the at least one additional frequency and using the phase of the at least one additional frequency to calculate an intra-frequency group distance.

5. The method of claim 2, wherein the first adjustment frequency and the second adjustment frequency are created using a lookup table.

6. A method of measuring a distance between two network devices, comprising:
    transmitting, from a first network device, a first range detection signal, the first range detection signal comprises a first frequency ($f_1$) and a second frequency ($f_2$) wherein a phase of the first frequency and the second frequency is constant;

receiving, at a second network device, the first range detection signal;

determining, at the second network device, a phase of the first frequency and a phase of the second frequency, referred to as $\varphi_{T1}$ and $\varphi_{T2}$, respectively;

transmitting, from a first network device, a second range detection signal, the second range detection signal comprises a third frequency ($f_3$) and a fourth frequency ($f_4$) wherein a phase of the third frequency and the fourth frequency is constant;

receiving, at a second network device, the second range detection signal;

determining, at the second network device, a phase of the third frequency and a phase of the fourth frequency, referred to as $\varphi_{T3}$ and $\varphi_{T4}$, respectively; and calculating a distance between the first network device and the second network device using values of $f_1$, $f_2$, $f_3$, $f_4$, $\varphi_{T1}$, $\varphi_{T2}$, $\varphi_{T3}$, and $\varphi_{T4}$, where the distance is an inter-frequency group distance measurement.

7. The method of claim 6, wherein the first frequency and the second frequency belong to a first frequency group, wherein a frequency group is defined as a set of frequencies generated using a common carrier frequency and wherein the third frequency and the fourth frequency belong to a second frequency group, different from the first frequency group and having a second common carrier frequency.

8. The method of claim 7, wherein there is no phase relationship between the common carrier frequency and the second common carrier frequency.

9. The method of claim 7, wherein the first frequency is created using the common carrier frequency and a first adjustment frequency, and the second frequency is created using the common carrier frequency and a second adjustment frequency, wherein a phase of the first adjustment frequency and a phase of the second adjustment frequency are equal.

10. The method of claim 9, wherein the first adjustment frequency and the second adjustment frequency are created using a lookup table.

11. The method of claim 9, wherein the second network device removes the common carrier frequency and the first adjustment frequency from the first frequency of the first range detection signal, using a common receiver carrier frequency and a first receiver adjustment frequency, respectively, to determine the phase of the first frequency and removes the common carrier frequency and the second adjustment frequency from the second frequency of the first range detection signal, using the common receiver carrier frequency and a second receiver adjustment frequency, respectively, to determine the phase of the second frequency.

12. The method of claim 6, wherein the inter-frequency group distance measurement is calculated based on an inter-frequency group phase difference, which is defined as a difference in total phase between the first network device and the second network device when transmitting and receiving the second range detection signal less a difference in total phase between the first network device and the second network device when transmitting and receiving the first range detection signal.

13. The method of claim 12, wherein the second network device performs an intra-frequency group distance measurement using only $f_1$, $f_2$, $\varphi_{T1}$, $\varphi_{T2}$, and calculates a difference between the inter-frequency group distance measurement and the intra-frequency group distance measurement, adjusts the inter-frequency group phase difference by $2\pi$ if the difference is greater than a predetermined threshold, recalculates the inter-frequency group distance measurement using an adjusted inter-frequency group phase difference and repeats the adjusting and recalculating until the difference is less than the predetermined threshold.

14. A system for measuring a distance between two network devices, comprising:

a first network device, configured to:
transmit a first range detection signal, the first range detection signal comprises a first frequency ($f_1$) and a second frequency ($f_2$), wherein the first frequency and the second frequency belong to a first frequency group, wherein a frequency group is defined as a set of frequencies generated using a common carrier frequency and wherein a phase of the first frequency and the second frequency is constant; and a second network device, configured to:
receive the first range detection signal;
determine a phase of the first frequency and a phase of the second frequency, referred to as $\varphi_{T1}$ and $\varphi_{T2}$, respectively; and
calculate a distance between the first network device and the second network device using values of $f_1$, $f_2$, $\varphi_{T1}$, and $\varphi_{T2}$, where the distance is an intra-frequency group distance measurement.

15. The system of claim 14, wherein the first network device generates the first frequency using the common carrier frequency and a first adjustment frequency and generates the second frequency using the common carrier frequency and a second adjustment frequency, wherein a phase of the first adjustment frequency and a phase of the second adjustment frequency are equal.

16. The system of claim 15, wherein the first adjustment frequency and the second adjustment frequency are created using a lookup table.

17. The system of claim 15, wherein the second network device removes the common carrier frequency and the first adjustment frequency from the first frequency of the first range detection signal, using a common receiver carrier frequency and a first receiver adjustment frequency, respectively, to determine the phase of the first frequency and removes the common carrier frequency and the second adjustment frequency from the second frequency of the first range detection signal, using the common receiver carrier frequency and a second receiver adjustment frequency, respectively, to determine the phase of the second frequency.

18. The system of claim 14, wherein the first network device is further configured to:
transmit a second range detection signal, the second range detection signal comprises a third frequency ($f_3$) and a fourth frequency ($f_4$) wherein a phase of the third frequency and the fourth frequency is constant; and wherein the second network device is further configured to:
receive the second range detection signal;
determine a phase of the third frequency and a phase of the fourth frequency, referred to as $\varphi_{T3}$ and $\varphi_{T4}$, respectively; and
calculate a distance between the first network device and the second network device using values of $f_1$, $f_2$, $f_3$, $f_4$, $\varphi_{T1}$, $\varphi_{T2}$, $\varphi_{T3}$, and $\varphi_{T4}$, where the distance is an inter-frequency group distance measurement.

19. The system of claim 18, wherein the first network device uses a second common carrier frequency, different from the common carrier frequency to generate the third frequency and the fourth frequency.

20. The system of claim 18, wherein the second network device calculates the inter-frequency group distance measurement based on an inter-frequency group phase difference, which is defined as a difference in total phase between the first network device and the second network device when transmitting and receiving the second range detection signal less the difference in total phase between the first network device and the second network device when transmitting and receiving the first range detection signal.

21. The system of claim 20, wherein the second network device performs an intra-frequency group distance measurement using only $f_1$, $f_2$, $\varphi_{T1}$, and $\varphi_{T2}$, and calculates a difference between the inter-frequency group distance measurement and the intra-frequency group distance measurement, adjusts the inter-frequency group phase difference by $2\pi$ if the difference is greater than a predetermined threshold and recalculates the inter-frequency group distance measurement using an adjusted inter-frequency group phase difference and repeats the adjusting and recalculating until the difference is less than the predetermined threshold.

* * * * *